United States Patent [19]

Suda

[11] Patent Number: 5,120,000
[45] Date of Patent: Jun. 9, 1992

[54] HIGH-SPEED MAGNETIC TAPE TRANSFER APPARATUS

[75] Inventor: Kenichi Suda, Fukaya, Japan

[73] Assignee: Kabushiki Kaisha Toshiba, Kawasaki, Japan

[21] Appl. No.: 638,151

[22] Filed: Jan. 9, 1991

Related U.S. Application Data

[63] Continuation of Ser. No. 378,222, filed as PCT/JP88/01072, Oct. 21, 1988, abandoned.

[30] Foreign Application Priority Data

Oct. 23, 1987 [JP]  Japan ................. 62-266546

[51] Int. Cl.⁵ .............................................. B65H 23/08
[52] U.S. Cl. ................................. 242/204; 242/75.47
[58] Field of Search ............... 242/75.47, 186, 191, 242/204; 360/95, 96.1–96.6

[56] References Cited

U.S. PATENT DOCUMENTS

| | | | |
|---|---|---|---|
| 4,442,985 | 4/1984 | Kishi et al. | 242/186 |
| 4,448,368 | 5/1984 | Skalko | 242/186 |
| 4,564,873 | 1/1986 | Hasimoto | 360/96.3 X |
| 4,573,645 | 3/1986 | Harris, Jr. | 242/75.47 |
| 4,649,442 | 3/1987 | Kunii et al. | |
| 4,661,864 | 4/1987 | Kuwajima | 360/95 X |
| 4,730,792 | 3/1988 | Jang | 242/204 |
| 4,747,564 | 5/1988 | Tsubota | 242/204 |
| 4,754,347 | 6/1988 | Kodama | 360/95 X |
| 4,807,061 | 2/1989 | Yoon | 242/204 X |

FOREIGN PATENT DOCUMENTS

| | | |
|---|---|---|
| 18-15211 | 6/1943 | Japan . |
| 52-144715 | 11/1977 | Japan . |
| 54-107714 | 8/1979 | Japan . |
| 61-151861 | 7/1986 | Japan . |

*Primary Examiner*—Daniel P. Stodola
*Assistant Examiner*—William G. Battista, Jr.
*Attorney, Agent, or Firm*—Cushman, Darby & Cushman

[57] ABSTRACT

A high-speed magnetic tape transfer apparatus designed for driving either a driven reel mount (1) or a driving reel mount (2) by using a reel motor (5) and a power-transmitting mechanism (6, 7), thereby to transfer magnetic (3) from one reel to another. A braking mechanism (8, 9) is located at the driven reel mount (1). A load-detecting circuit (25, 26, 31) detects a predetermined value corresponding to the changes in the load on the reel motor (5). A control section (13, 14, 15, 18, 20, 26) controls the braking force applied by said brake mechanism (8, 9), in accordance with the detection output of the load-detecting circuit (25, 26, 31).

6 Claims, 5 Drawing Sheets

HIGH-SPEED MAGNETIC TAPE TRANSFER APPARATUS

This is a continuation of application Ser. No. 07/378,222 filed as PCT/JP88/01072, Oct. 21, 1988, which was abandoned upon the filing hereof.

TECHNICAL FIELD

The present invention relates to a high-speed magnetic tape transfer apparatus for transferring magnetic tape between two reels set in a magnetic data-recording/apparatus, and more particularly to a high-speed magnetic tape transfer apparatus which can control the braking force acting on the reel mounts, in accordance with the amount of tape on each reel.

BACKGROUND ART

A magnetic data-recording/reproducing apparatus has a mechanism for driving reel mounts at high speed so as to transfer magnetic tape from one reel to another. This mechanism has the structure shown in FIG. 1. As is shown in the figure, S reel (supply) and T reel (takeup) (neither shown) are removably placed on a tape supply (S) reel mount 1 and a tape take-up (T) reel mount 2, respectively. To transfer tape fast, one end of the magnetic tape 3 is drawn from the S reel, guided through a predetermined path, and wrapped around a cylinder 4 which has a magnetic head mounted on it, and taken up around the T reel. In other words, the tape 3 is transferred in the method known as full-loading, fast transfer. Depending on whether the magnetic tape 3 is to be transferred forward or rewound at high speed, either the S reel mount 1 or the T reel mount 2 is rotated by an idler 7 which in turn is rotated by a motor pulley 6 connected to a reel motor 5, which in most cases is driven by a constant voltage. Fast transfer or rewinding of the tape can, however, be accomplished by means other than the reel motor 5; in some cases, it can be achieved by transmitting the drive force from a capstan motor (not shown) or a cylinder motor (not shown) to the S reel mount 1 or the T reel mount 2.

A soft brake 8 is provided beside the driven reel mount 1, and applies a tension greater than a predetermined value to the magnetic tape 3 when the tape is being transferred at high speed, so as to prevent the tape 3 from slackening. The soft brake 8 comprises a support pin 9, a brake lever 10 rotatably supported by the pin 9, a brake shoe 11 located at one end of the brake lever 10 and normally in contact with the outer circumferential surface of the driven reel mount (in the figure, the S reel mount 1), and a spring 12 attached to the other end of the brake lever 10 and urging the brake shoe 11 against the outer circumferential surface of the reel mount.

In the conventional reel-mount driving mechanism described above, the brake torque of the soft brake 8 is constant, since it is generated by the brake shoe 11 urged by the spring 12 against the outer circumferential surface of the S reel mount 1. FIGS. 2A, 2B, and 2C illustrate how the drive voltage of the reel motor 5, the drive current of the reel motor 5, and the amount of tension applied to the tape change in accordance with the diameter of the tape roll on the reel mount driven by the conventional reel-mount driving mechanism. The minimum tape tension value, shown in FIG. 2C, is determined on the basis of the diameter of the tape roll at the start of the fast transfer or rewinding. The above figure illustrates the tape-tension characteristic which is detected when the tape roll on the driving reel is at the minimum diameter, while the tape roll on the driven reel has the maximum diameter. As the magnetic tape 3 is being transferred from one reel to the other, the diameter of the tape roll on the driving reel increases, and that of the tape roll on the driven reel decreases. Since, as mentioned earlier, the brake torque applied to the driven reel mount is constant, the tension on that portion of the magnetic tape 3 which is being drawn from the driven reel to the driving wheel is a function of the ratio of the brake torque on the driven reel mount to the radius of the tape roll on the driven reel. Therefore, since the radius of the tape roll on the driven reel decreases as the tape 3 is taken up by the driving reel, the tension on that portion of the tape 3 which is about to be taken up around the driving reel gradually increases. The amount of tension further increases due to the tape-guiding path. The torque required for the driving reel to take up the tape, is determined by the ratio of the tension on the tape about to be taken up, to the radius of the tape roll already thereon up. Hence, even if the tension on the tape, which is about to be taken up were to remain unchanged throughout the winding process, the torque required for the tape to be taken up does increase as more and more tape is taken up by the driving reel, since this results in a steady increase in the radius of the tape roll thereon. Due to the increase in the tension applied on the tape being taken up and the resultant increase in the torque required to take it up, the torque required near the end of the tape take-up is therefore far greater than that required at the beginning. As a result, the amount of current which must be supplied to the reel motor 5 driving the driving reel mount increases drastically near the end of tape take-up. Thus, the inner a turn of the tape wound around the reel, the lower the tension applied, whereas the outer the turn, the higher the tension applied.

As has been described, when the conventional reel-mount driving mechanism is used, the innermost turns of the tape wound around a reel are likely to slacken, whereas the outermost turns are likely to be too tense. The minimum tension required to prevent the wound tape from becoming too tense is that tension applied on the tape while the tape is being transferred forward at high speed, or that tension applied on the tape at the beginning of the tape rewinding. Hence, the tension on the tape is higher than necessary at near the end of the tape rewinding, the load on the reel motor 5 increases. Here arise the problem that the motor consumes much power, and its lifetime may decrease. This problem must be solved, particularly when the magnetic tape 3 is transferred forward or rewound at high speed, with its one portion wrapped around the cylinder 4 in a so-called "full-loading" condition, with the result that a considerable load is imposed on the tape in the tape-guiding path.

DISCLOSURE OF THE INVENTION

The object of the present invention is to provide a high-speed magnetic tape transfer apparatus which can solve the problem inherent in the conventional reel-mount driving mechanism, that since the brake torque applied by the soft brake on the driven reel mount is constant, the tension on magnetic tape is low during the fast transfer or rewinding of the tape, or at the beginning of winding the tape, and gradually increase, whereby the magnetic tape becomes too tense as it is further wound, and the load on the drive motor increases, and the drive consumes much power. In other words, the object of the invention is to provide a high-speed magnetic tape transfer apparatus which can prevent the tape from slackening or becoming excessive tense, and can reduce the load on the drive motor.

To attain the above object, according to the present invention, there is provided a high-speed magnetic tape transfer apparatus designed for driving either a driven reel mount or a driving reel mount by using a reel motor and a power-transmitting mechanism, thereby to transfer magnetic tape at high speed from one reel to another. The apparatus comprises brake means located at the driven reel mount, load-detecting means for detecting a predetermined value equivalent to the changes in the load on the reel motor for transferring the magnetic tape at high speed; and control means for controlling the braking force applied by the brake means, in accordance with the value output by the load-detecting means.

In the apparatus, the value equivalent to the change in the load on the reel motor is detected, and the braking force of the brake means which is applied on the driven reel mount is controlled such that the change of the load falls within a predetermined range. Therefore, the minimum tension is that one applied on the magnetic tape near the end of the high-speed tape transfer or near the end of the tape rewinding. Thus, the load on the reel motor is almost constant at the start of the tape winding and near the end of the tape winding, and can be held at a low level. After the tape has been wound around a reel, the tension on the inner turns is high, whereas the tension on the outer turns is low. As a result, the wound tape is not too tense.

BRIEF DESCRIPTION OF THE DRAWINGS

The above object and other objects of the present invention, and the features of the invention will be understood from the following description of some embodiments, which is made with reference to the accompanying drawings, in which.

BEST MODE OF EMBODYING THE INVENTION

A high-speed magnetic tape transfer apparatus according to an embodiment of the present invention will now be described, with reference to the accompanying drawings.

Figure 1:
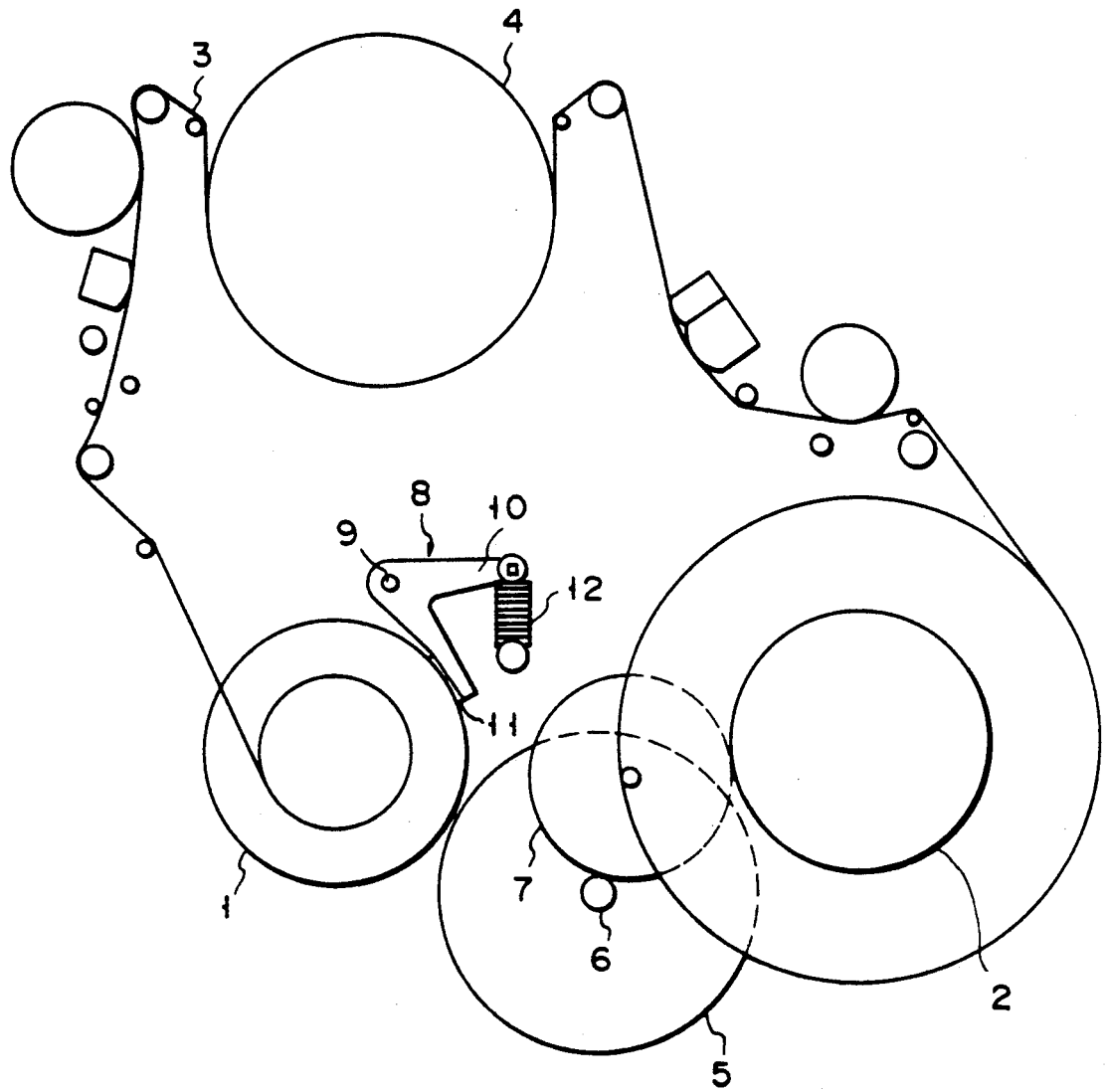
FIG. 1 is a plan view showing a conventional reel-mount driving mechanism.
Figure 2A:
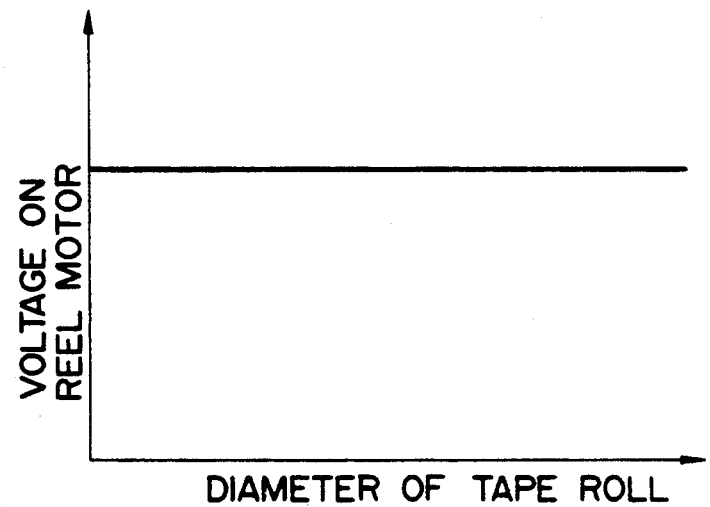
FIGS. 2A, 2B, and 2C are graphs showing the relationships between the diameter of a tape roll, on the one hand, and the voltage applied on the reel motor, the current supplied to the reel motor, and the tension applied on the tape, on the other hand, which are observed in the conventional reel-mount driving mechanism.
Figure 2B:
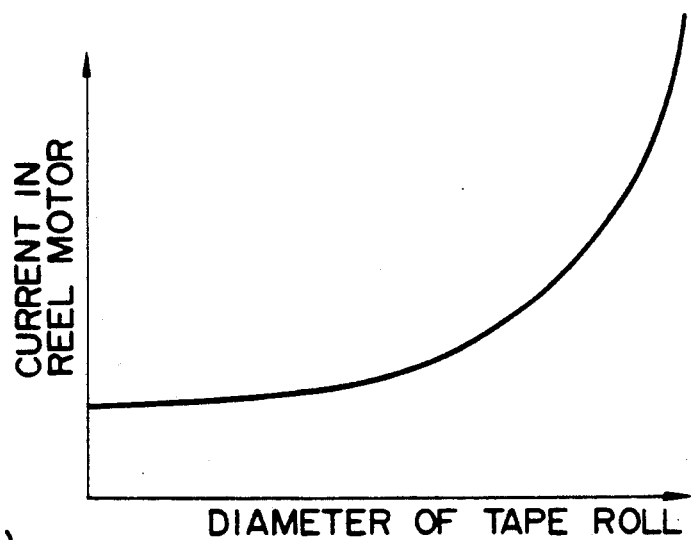
Figure 2C:
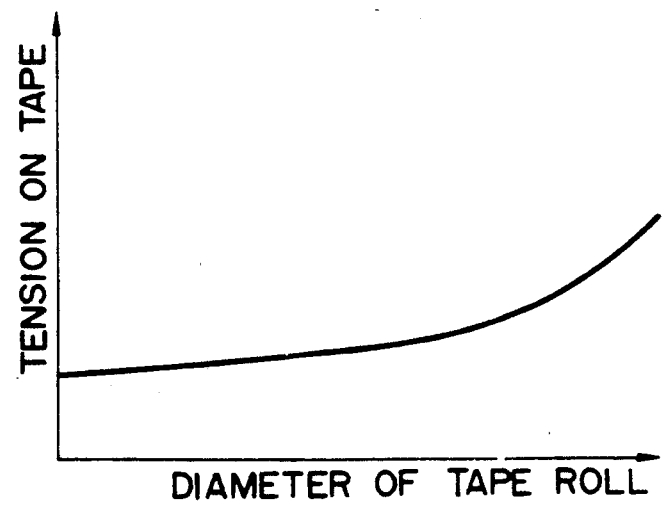
Figure 3:
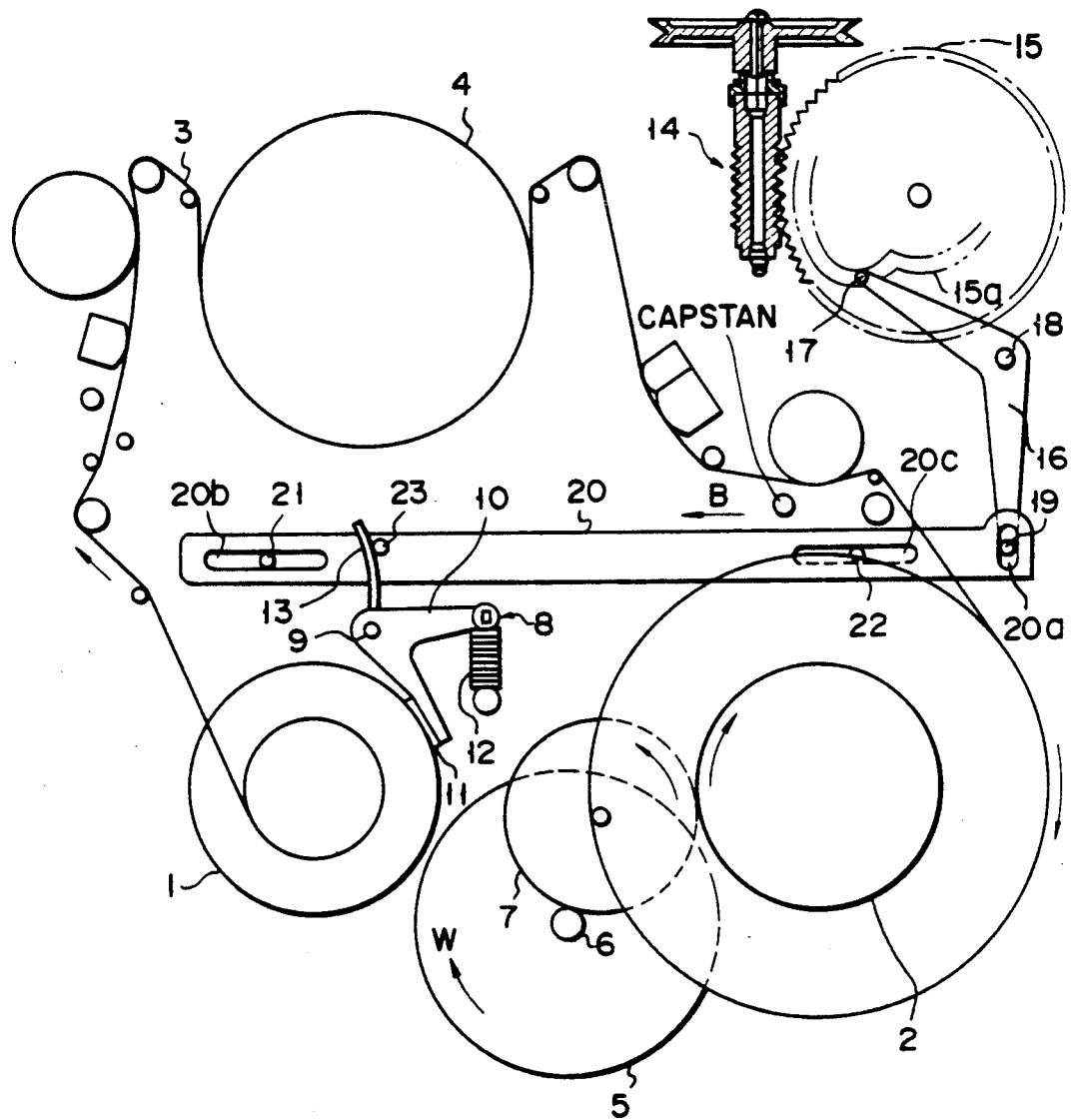
FIG. 3 is a plan view of the mechanism incorporated in a high-speed magnetic tape transfer apparatus according to an embodiment of the present invention.
Figure 4:
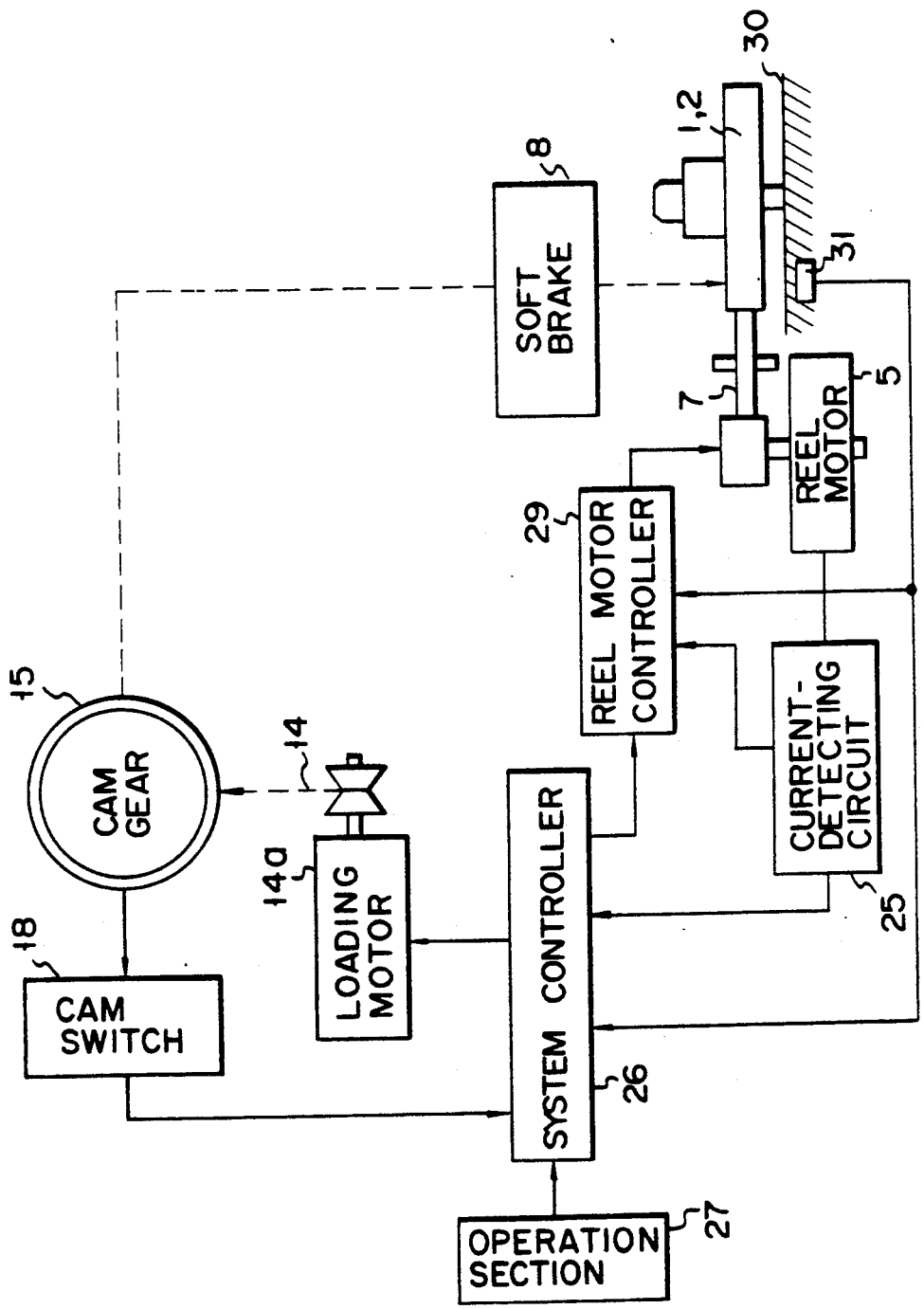
FIG. 4 is a block diagram showing the electric-circuit section of the embodiment.

FIGS. 3 and 4 show an embodiment of the invention. In these figures, the components identical or similar to those of the conventional mechanism shown in FIG. 1 are designated by the same numerals. These components will not be described in detail. This embodiment is characterized in that the brake torque of a soft brake 8 which brakes the S reel mount 1 is controlled.

FIG. 3 shows the reel-mount driving mechanism of the apparatus, which is in the high-speed forward transfer mode. An idler 7 is rotated toward a T reel mount 2. Rotational drive force acting in the direction of arrow A is transmitted from a reel motor 5 to the T reel mount 2 via an idler 7, whereby the magnetic tape 3 is taken up. A leaf spring 13 is fastened at one end to the brake lever 10 of a soft brake 8. When the other end portion of the leaf spring 13 is pushed in the direction of arrow B, the brake lever 10 is rotated counterclockwise. As a result, the force of the spring 13 is canceled out, whereby the brake torque of the soft brake 8 can be changed. A cam gear 15 is used, which can be rotated by a drive mechanism 14 including a loading motor 14a shown in FIG. 4. The cam gear 15 has a cam groove 15a having a specific shape. A roller 17 attached to one end of a cam lever 16 is set in the cam groove 15a. The Figure also shows a captan 100. The cam lever 16 is rotatably supported by a pin 18 planted on a base plate (not shown). A pin 19 is attached to the other end of the cam lever 16. This pin 19 is inserted in an elongated hole 20a made in one end of a slider 20. Thus, the lever 16 is coupled at the other end to the slider 20. The slider 20 is a rectangular plate and has two elongated holes 20b and 20c, one in each end portion. Both holes 20b and 20c extend parallel to the lengthwise direction of the slider 20. Guide pins 21 and 22, both plated on the base plate, are inserted in the elongated holes 20b and 20c, such that the slider 20 can slide in the direction of arrow B and in the direction opposite thereto. A boss 23 is fixed to the slider 20, and can abut against the leaf spring 13.

FIG. 4 shows an electric circuit including control means which is used to transfer tape forward or rewind at high speed. A current-detecting circuit 25 is connected to the reel motor 5, for detecting a predetermined current flowing in the reel motor 5. The detection output of this current-detecting circuit 25 is supplied to a system controller 26. The system controller 26 controls a loading motor 14a, thereby to rotate a cam gear 15 to set various operation modes to the magnetic recording/reproducing apparatus in accordance with the mode-setting signals supplied from an operation section 27 or the switching signals supplied from a cam switch 28. Also, the system controller 26 controls a reel motor controller 29, which in turn controls the reel motor 5. It is assumed here that a fast-forward transfer mode signal has been supplied from the operation section 2 to the system controller 26.

The operation of the embodiment will now be explained. In response to the fast-forward transfer mode signal, the system controller 26 causes the drive mechanism 14 to rotate the cam gear 15. The cam gear 15 moves the cam lever 16 such that the slider 20 moves in the direction opposite to arrow B until the boss 23 of the slider 20 moves to a position away from the leaf spring 13. At this time, the braking torque of the soft brake 29 has the maximum value determined by the leaf spring 13. The reel motor 5 starts rotating in the direction of arrow A, under the control of reel motor controller 29, which in turn is controlled by the system controller 26. Hence, the motor pulley 6 rotates the idler 7, whereby the T reel mount is rotated. Therefore, the reel on the T reel mount 2 takes up the tape 3 drawn from the reel on the S reel mount. The reel motor controller 29 gradually increases the voltage applied to the reel motor 5, so that a mechanical action is achieved which is strong enough to change the braking torque on the S reel mount to a predetermined value. When the voltage on the reel motor 5 increases to a predetermined value, the current detected by the current-detecting circuit 25 increases, too. When the load on the reel motor 5 increases, and the current detected increases to a predetermined value or above this value, the system controller 26 controls the drive mechanism 14, thereby rotating the cam gear 15. The lever 16 rotates clockwise along the cam groove 15a, whereby the slider 20 moves in the direction of arrow B, and the boss 23 pushes the leaf spring 13 in the direction of arrow B. As a result of this, the torque applied on the S reel mount decreases, thus suppressing an increase of the electrical current. Thereafter, as the diameter of the tape roll on the S reel decreases, the tape tension increases, and so does the load on the reel motor 5. The braking torque is reduced again, as has been explained. A specific current value is set to the current-detecting circuit 25 for detecting the current flowing in the reel motor 5.

Figure 5A:
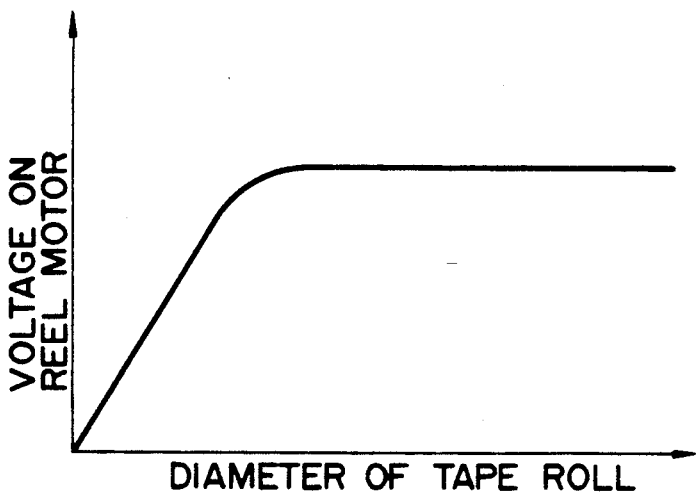
FIGS. 5A, 5B, and 5C are graphs representing the relationships between the diameter of a tape roll, on the one hand, and the voltage applied on the reel motor, the current supplied to the reel motor, and the tension applied on the tape, on the other hand, which are observed in the embodiment of the present invention.
Figure 5B:
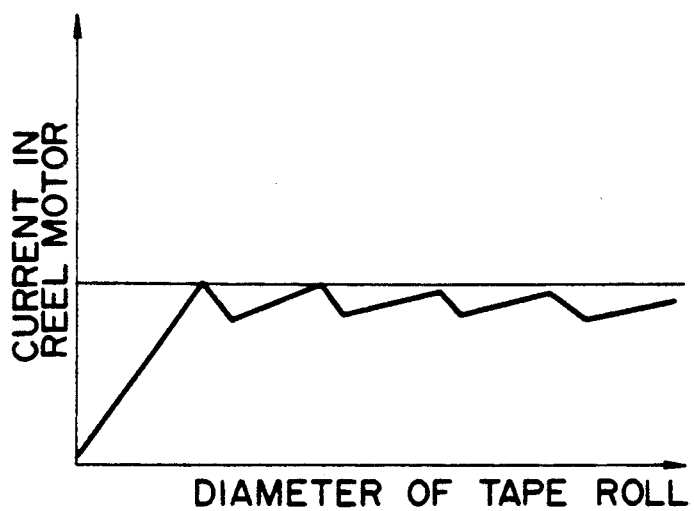
Figure 5C:
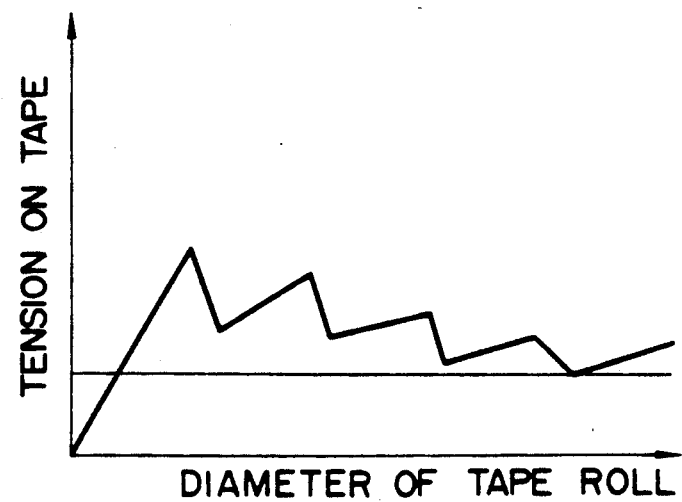

FIGS. 5A, 5B, and 5C illustrate how the voltage on the reel motor 5, the current in the motor 5, and the tape tension vary with the diameter of the tape roll, in the reel-mount driving mechanism used in the embodiment. Since the braking torque on the S reel mount 1 is controlled so that the current in the reel motor 5 falls within a predetermined range, the torque which the T reel requires to take up the tape also falls within a predetermined range. Therefore, once the minimum tape tension is set, the minimum torque is: (the minimum tape tension)×(the maximum diameter of the tape roll on the take-up reel). Hence, the minimum torque falls within the predetermined range, regardless of which portion of the tape is being taken up. By contrast, in the conventional reel-mount driving mechanism, the minimum torque required to take up the tape is (the minimum tape tension)×(the minimum radius of the tape roll on the take-up reel) at the beginning of the fast-forward transfer or at the beginning of the rewinding of the tape, and is (the minimum tape tension)×(the maximum radius of the tape roll on the take-up reel)×(the ratio of the maximum radius of the tape roll on the driven reel to the minimum radius of the tape reel on the driving reel) near the end of the fast-forward transfer or at the beginning of the rewinding of the tape. The maximum torque required for taking up the tape in the embodiment of the present invention is (the minimum radius of the tape roll on the driven reel/the maximum radius of the tape roll on the driven reel) times the greatest torque required for taking up the tape in the conventional reel-mount driving mechanism, and is obviously much less than in the prior art reel-mount driving mechanism. This maximum torque required varies slightly, however, since the ratio of the minimum radius of the tape roll on the driven reel to the maximum radius of the tape roll on the driven reel changes due to various changes, such as the change in the efficiency of transmission of driving force and the change in values set. Since the tape take-up torque is substantially constant, the tension on the tape wound around the T reel is high for the inner turns, and low for the outer turns. The tape is not wound too tense or tight.

In the embodiment described above, during the fast-forward transfer of the tape, the tape tension becomes minimum near the end of this fast-forward transfer. Hence, the load on the reel motor 5 remains virtually unchanged and small throughout the fast-forward transfer of the tape. This helps to reduce the power consumption and lifetime of the reel motor 5. Moreover, since the tension on the tape wound around the T reel is high for the inner turns, and low for the outer turns, the tape is not wound too tense or tight.

In the above embodiment, the braking torque on the S reel is controlled to decrease. Instead, this braking torque can be controlled to increase or decrease. If this is the case, the oscillation of the control system can be prevented by applying a response difference, such as hysteresis, to the predetermined current value set to the current-detecting circuit 25. The above-mentioned control, which is relatively minute, can be replaced by a relatively coarse control. In the case where a coarse control suffices, the cam groove 15a of the cam gear 15 can be designed such that the boss 23 of the slider 20 pushes the leaf spring 13, step by step, with discrete stokes, thereby rotating the cam gear 15, little by little, in accordance with the current value detected by the circuit 25. Alternatively, the cam groove 15a can be so designed that the boss 23 either pushes or does not push the leaf spring 13, thus controlling the braking torque on the S reel to some extent. Further, the cam gear 15, the cam switch 28, the cam lever 16, and the slider 20 can be replaced by the components of the drive mechanism for controlling the mechanical elements used for loading or unloading the magnetic tape 3 or for performing various operations.

It has been described how the above embodiment operates in the FF mode to transfer magnetic tape 3 at high speed. The embodiment can also operate in the REW mode to rewind the tape 3 at high speed. To rewind the tape 3 at high speed, it suffices to arrange the soft brake 8, the leaf spring 13, and the boss 23 on the side of the T reel mount 2, at the positions symmetrical to those which these components assumes to transfer the tape 3 forward at high speed. Furthermore, a capstan motor or a cylinder motor can be used, in place of the reel motor 5, to transfer the tape 3 forward at high speed or to rewind the tape 3 at high speed. In this case, it suffices to detect the amount of the current flowing in the capstan motor o the cylinder motor and to control the braking torque o the driven reel mount in accordance with the detected current.

The predetermined value corresponding to the changes in the load on the reel motor 5 can be detected by methods other than by detecting the current flowing in the reel motor 5 by means of the current-detecting circuit 25. For instance, as is shown in FIG. 4, a pulse detector 31 for detecting the position where the tape is wound around a reel placed on either reel mount is mounted on the base 30 supporting the reel mounts 1 and 2. In accordance with the output of this detector 31, which represents the number of rotations of the reel, the system control 26 determines a predetermined position where the tape is wound around the reel. The slider 20 is moved in accordance with the position thus determined, whereby the braking torque on the S reel mount 1 is changed to the value optimum to the diameter of the tape reel on the reel. To detect the position where the tape is wound around the reel, the techniques disclosed in Japanese Patent Disclosure 53-6004 (corresponding to U.S. Pat. No. 4,171,231, French Patents 2,357,978 and 2,392,914, British Patent 1,555,059, and West German Patent 2,730,134) can be utilized.

In the technique disclosed in these patent-related documents, reference data representing the characteristics of reels and webs of different types (i.e., constants specific to various types of cassettes) is stored in a memory, and the absolute position of the tape is calculated in accordance with a specific formula, from the reference data and the speed ratio between the supply reel and the take-up reel.

Further, the system controller 26 can be used to detect a predetermined frequency of the pulses output by the pulse detector 31. When the frequency of the pulses falls to a predetermined value or below this value, it is determined that the load on the reel motor 5 has increased. Then, the braking torque on the S reel mount 1 is reduced.

As has been described, in the present invention, a predetermined value corresponding to the change in the load on the reel motor transferring magnetic tape is detected, and the braking force applied on the driven reel by the braking means is controlled in accordance with the signal representing the value thus detected. Therefore, the current in the reel motor can be reduced while maintaining the tape tension at a required level. In addition, it is possible to prevent the tape from being wound too tight.

INDUSTRIAL APPLICABILITY

The apparatus according to the present invention is to transfer tape at high speed in a magnetic recording/reproducing apparatus, and can be used in a VTR to transfer tape forward at high speed or rewind tape at high speed in full-loading condition.

I claim:
1. A high-speed magnetic tape transfer apparatus comprising:
   means, including a capstan, for transferring a tape at a constant speed;
   high-speed transfer mode setting means for setting a fast forward mode or a fast rewind mode in a magnetic tape recording/reproducing device;
   high-speed transfer path forming means having a pair of reel mounts and a cylinder located with a rotary head, for forming a path capable of high-speed transfer in the fast forward mode or rewind mode, in such a manner that the magnetic tape, which is wound on a pair of reels mounted on said reel mounts in accordance with the fast forward mode or rewind mode set by said high-speed transfer mode setting means, is separated from the capstan for transferring the tape at constant speed in a full-loading scheme wherein said magnetic tape is wound around the cylinder;
   high-speed transfer drive means having a reel motor and a power transmission mechanism for performing the high-speed transfer in said path on said magnetic tape formed by said high-speed transfer path forming means, by selectively transmitting power from said reel motor to one of said pair of reel mounts in accordance with the fast forward mode or rewind mode set by said high-speed transfer mode setting means, said reel motor serving as a sole driving source for performing the high-speed transfer in the fast forward mode or rewind mode;
   reel motor drive control means for driving said reel motor at a predetermined voltage and by a predetermined current to transfer the magnetic tape at high speed in the fast forward mode or rewind mode set by said high-speed transfer mode setting means, said reel motor drive control means gradually increasing a voltage supplied to said reel motor at the beginning of the fast forward mode or rewind mode and then maintaining the voltage at a predetermined level;
   a soft brake mechanism for, when the magnetic tape is transferred at high speed in the fast forward mode or rewind mode, mechanically applying a predetermined soft braking force to a driven reel mount of said pair of reel mounts to allow the magnetic tape to be transferred at high speed with predetermined tension and prevent the magnetic tape from being loosely wound on a drive reel mount of said pair of reel mounts;
   load detection means for detecting a predetermined value corresponding to an increase in load applied to said reel motor when said magnetic tape is transferred at high speed in the fast forward mode or rewind mode; and
   a braking force control mechanism for, every time the predetermined value is detected by said load detection means, mechanically causing said soft brake mechanism to gradually decrease in the predetermined soft braking force, so that the load applied to said reel motor is prevented from exceeding a predetermined value to cause the current of said reel motor to fall within a substantially fixed range and cause torque necessary for taking up the magnetic tape on the drive reel mount at high speed to fall within a substantially fixed range, thereby preventing the magnetic tape from being wound too tight on the drive reel mount while maintaining minimum required tape tension.

2. A high-speed magnetic tape transfer apparatus according to claim 1, wherein said load detection means includes a current-detecting circuit for detecting a predetermined value of a current driven by said reel motor drive control means.

3. A high-speed magnetic tape transfer apparatus according to claim 1, wherein said load detection means includes means for detecting a predetermined position where the magnetic tape is wound around reels placed on said reel mounts.

4. A high-speed magnetic tape transfer apparatus according to claim 1, wherein said load detection means includes means for detecting a predetermined frequency of pulses representing the rotations of at least said driving reel mount.

5. A high-speed magnetic tape transfer apparatus according to claim 1, wherein said soft brake mechanism is a brake urged by a spring against the outer periphery of said reel mount, and said braking force control mechanism comprises a cam member which rotates in accordance with a detection output of said load-detection means, a slider which is driven by the cam member, and a spring member which is fastened to said brake and pushed by the slider.

6. A high-speed magnetic tape transfer apparatus according to claim 5, wherein said cam member has a cam groove designed for changing the braking force applied by said brake, either gradually or in steps.

* * * * *